April 10, 1945.  A. F. TURNER  2,373,639
METHOD AND APPARATUS FOR FORMING FILMS
Filed Jan. 23, 1943
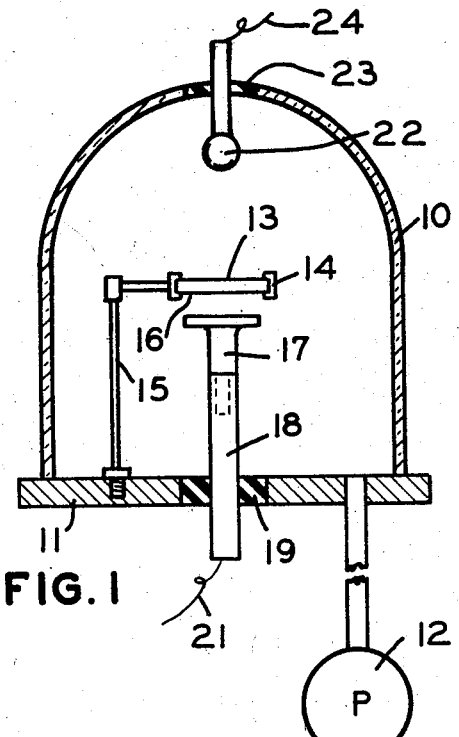
FIG. 1
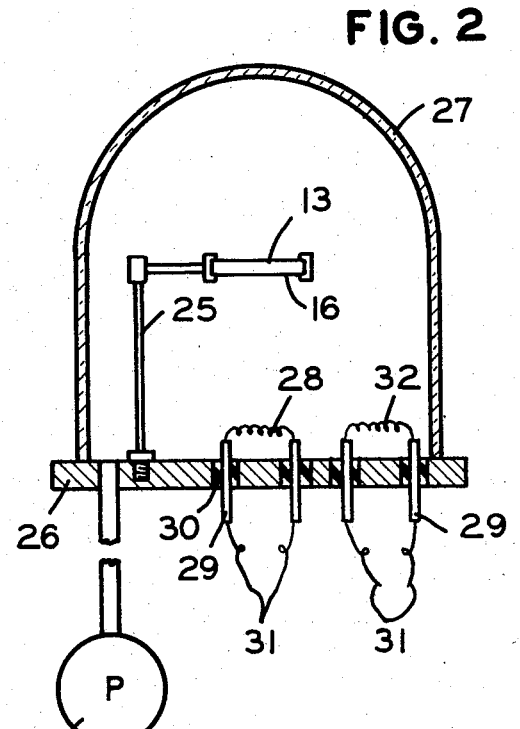
FIG. 2
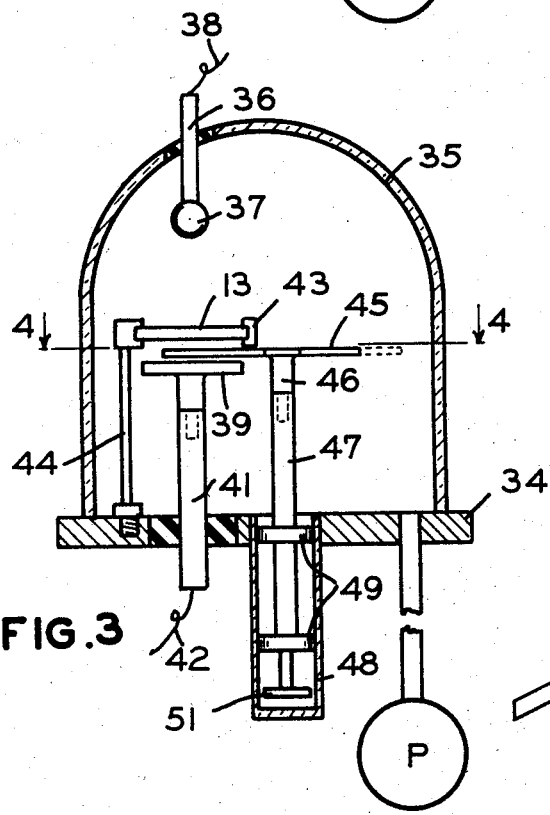
FIG. 3
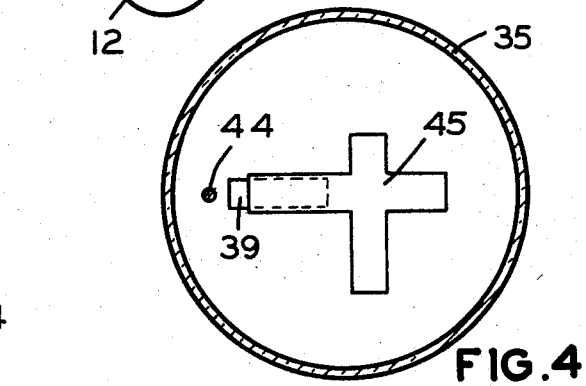
FIG. 4
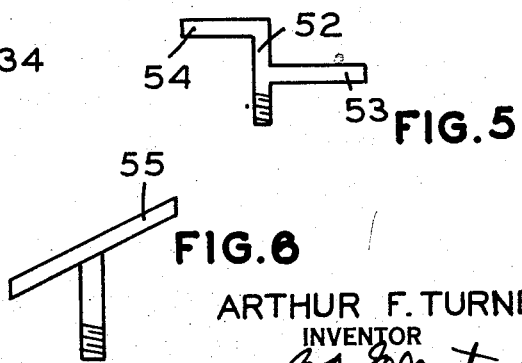
FIG. 5
FIG. 6
ARTHUR F. TURNER
INVENTOR
BY
ATTORNEYS Patented Apr. 10, 1945

2,373,639

UNITED STATES PATENT OFFICE 2,373,639

METHOD AND APPARATUS FOR FORMING FILMS

Arthur F. Turner, Brighton, N. Y., assignor to Bausch & Lomb Optical Company, Rochester, N. Y., a corporation of New York Application January 23, 1943, Serial No. 473,327

5 Claims. (Cl. 117—47)

This invention relates to metallic films and to the apparatus for and the method of forming the same.

A feature of the present invention is the ability to simultaneously form with the apparatus and method disclosed metallic films having different reflecting and transmitting characteristics on a single body or support. The line of demarcation between adjacent zones of the film may be sharply defined or, if desired, the change in the characteristics of adjacent zones may be gradual.

The film is formed while the film-forming material and the body having the surface to be coated is maintained in a vacuum. This is accomplished preferably by condensing vapors of the film-forming material, or sputtering the same, on the desired surface while the body is maintained in an evacuable container. In the preferred cycle of operation, the body or support is mounted within a container intermediate a pair of electrodes connected to a source of high voltage current, whereafter the container is at least partially evacuated, the electrodes energized, and the surface of the body conditioned by the discharge created by the current passed between the two electrodes.

It is now preferred to form the electrodes of a metal which will not disintegrate due to the current used, that is, a metal which will not sputter, and although there are a number of metals which may be used to form the electrodes, such as aluminum, beryllium, silicon, and carbon, it is now preferred to form the same of magnesium or a metal rich in magnesium. A large number of magnesium-rich metals are produced commercially in this country and a number of them can be used. I have found that excellent results can be obtained by using a metal sold under the trade-name "Dowmetal F."

The current between the electrodes is broken after a predetermined length of time and thereafter the film-forming material is deposited on the conditioned surface of the body while the same is maintained under a pressure substantially the same as or lower than that under which the conditioning operation was carried out depending on the film-forming method used. If desired, the actual film-forming operation can be carried on in the same container as was the conditioning operation or the body can be transferred to a different container for receiving the film.

If the electrode is formed with a face co-extensive with and held parallel to the surface to be coated during the conditioning discharge, the film subsequently produced will be substantially uniform. The resultant film has a higher transmission, where the body is transparent or translucent, and a lower air-to-film reflectivity than films deposited on surfaces which have not been conditioned. Thus some preselected portion of the surface may be covered during at least a portion of the conditioning operation by an occluding plate or shutter of suitable shape and design. This results in the film having surfaces of different characteristics, for it has been found that the film will form more readily on that portion of the surface covered during the discharge and this latter film will have reflecting and transmitting characteristics different from the film formed on the portion of the surface which was not covered during the conditioning operation.

Furthermore, films produced by the method of the present invention have been found to scatter light when examined in a strong beam of light, both by reflection and transmission while films deposited on surfaces which have not been conditioned do not scatter light.

A film having a plurailty of zones of different reflecting and transmitting characteristics can be formed by blocking various portions of the surface during the conditioning operation. This may be accomplished by providing a plurality of occluding plates or shutters and mounting the same so that they may be moved relative to the surface to be coated during the conditioning operation.

The amount of the film deposited on the surface is also dependent on the distance the electrode is spaced from the surface to be coated during the discharge or conditioning operation. Accordingly, films can be formed, the reflecting and transmitting characteristics of which are different in different portions of the surface of the film by mounting the electrode so that it is spaced from the surface a greater distance at one end of the body than the other.

Thus, films of different optical characteristics may be formed by merely varying the shape of the electrode and the distance between the same and the surface to be coated during the conditioning or discharge operation.

Other objects and advantages will appear from the following description taken in connection with the accompanying drawing in which:

Fig. 1 is a sectional view of one form which the apparatus of the present invention may take for carrying out the discharge or conditioning operation as well as the sputtering operation.

Fig. 2 is a view similar to Fig. 1, but showing the apparatus by which evaporated films may be formed.

Fig. 3 is a sectional view of another form of the apparatus of the present invention.

Fig. 4 is a section taken along line 4—4 of Fig. 3.

Fig. 5 is a view showing one form of a conditioning electrode which may be used for forming step wedges.

Fig. 6 is a view similar to Fig. 5, but showing a modified form of the conditioning electrode.

The container which houses the apparatus used to carry out the method of the present invention may comprise any detachable enclosure provided with means for affording access to the interior thereof and having means within the same for removably supporting a body having the surface to be coated. In the now preferred form of the invention, the apparatus comprises a bell jar 10 supported by a suitable base plate 11 connected by any suitable means to a high vacuum pump shown diagrammatically at 12. The jointure between the bell jar 10 and the base plate 11 can be made tight to atmospheric pressure by forming a seal therearound with some suitable sealing material.

The body 13 is mounted in a suitable support 14 carried by a stanchion 15 having a foot portion secured to the base plate 11. The surface 16 of the body 13 which is to receive the film is preferably placed facing downward to prevent any dust or other foreign particles present in the bell jar 10 from settling thereon.

An electrode 17, detachably mounted to a suitable support 18 fixed in the base plate 11 by a sealing grommet 19, is connected to a source of high voltage current, not shown, by means of a lead-in conductor 21. The electrode 17 in the form illustrated in Fig. 1 is preferably constructed with one face at least co-extensive with the surface to be coated. The face of the electrode is held by the support 18 closely adjacent the surface to be subsequently coated with the film and it is now preferred to mount the electrode not more than 15 centimeters from the surface. A second electrode 22, carried by a grommet 23 fixed in an aperture formed in the wall of the bell jar 10, is connected by a conductor 24 to the source of current.

Although any metal which will not sputter or disintegrate by reason of the high voltage current can be used to form the electrode, in the preferred form of the present invention, the electrodes or at least the electrode 17 is formed of magnesium or a metal rich in magnesium. I have found that of the easily procurable magnesium-rich metals, an alloy sold under the trade-name "Dowmetal F" has proven to give excellent results when used to form the electrode 17. The alloy known as "Dowmetal F" consists of 95.7% magnesium, 4.0% aluminum, and 0.3% manganese. Other metals such as aluminum, beryllium, silicon and carbon may be used although the magnesium and magnesium-rich metals are more practical and have given excellent results in operation.

In carrying out the method of the present invention, after the bell jar is sealed the same is pumped down to within the range of 50 to 200 microns. When the container has been evacuated to the desired pressure, a high voltage current is passed between the two electrodes 17 and 22 and the surface to be coated immersed in the glow discharge created. In the now preferred manner of carrying out the method of the present invention, the energizing current is preferably 40 milliamperes at a voltage of 10,000 to 15,000 volts. Although alternating current has generally been used to energize the electrodes, direct current can be used if the electrode 17 be made the cathode.

After the conditioning or discharge operation has been carried on for approximately one hour, the bell jar 10 can be removed from the base plate 11 and the body 13 removed and placed in a suitable holder 25 supported on a base plate 26 on which may be placed a container 27. The container 27, like the container 10, is connected to a vacuum pump to permit the container 27 to be evacuated after the jointure between the same and the base plate 26 has been made tight to atmospheric pressure.

The base plate 26 also carries a heating filament 28 connected across suitable posts 29 insulatedly mounted in the base plate 26 by sealing grommets 30. The filament 28 is connected to a suitable source of current by means of a conductor 31 and is used to vaporize the film-forming metal which may be placed in direct contact with the filament 28, or if desired, placed in a small crucible which can then be mounted in close proximity to the filament 28.

After the container is pumped down to a pressure within the range of 0.1 to 0.04 micron, the filament 28 is energized and the usual evaporation process is carried out. When a film of the desired thickness has been formed on the surface 16, the seal between the container 27 and the base plate 26 is broken, the container 27 separated from the base plate 26, and the body 13 removed from the support 25.

It will be obvious that the evaporation cycle can be carried out in container 10, if desired, by mounting the electrode 17 in such a manner that it can be moved back from its position shown in Fig. 1 to expose the surface 16 to the vapors of the material created by a filament mounted on the plate 11.

The resulting film, if the face of the electrode 17 was held parallel to the surface 16, will be uniform and will have a higher transmission and a lower air-to-film reflectivity than films heretofore deposited on surfaces not conditioned by the discharge operation above described. The metal appears to form less readily on conditioned surfaces than those not conditioned, for it has been found that the deposit which will form in a predetermined time on a surface which has been conditioned is less than the deposit which will form in the same time on a surface which has not been conditioned.

In the case of metals which show marked variation in color at different thicknesses, such as gold, the zones of the film deposited on conditioned portions of the surface are apparent not only by the increased transmission and decreased reflectivity but also can be distinguished from zones on surfaces not conditioned by the difference in color. Thus gold on conditioned surfaces appears redder in color by second surface reflection than on surfaces which have not been conditioned, and by transmission, this metal on conditioned surfaces appears a shade lighter green than does the metal deposited on surfaces not conditioned by the conditioning operation of the present invention.

The effect of the discharge on the surface treated is a matter of conjecture and no effort will be made here to theorize as to what change takes place on the surface or to the body or what effect the discharge has on the metal subsequently deposited on the surface of the body.

The conditioning operation has been observed to exert a remarkable preservative effect on evaporated aluminum film. It is known that in the course of time, the oxide film formed on the aluminum grows at the expense of the aluminum metal. The conditioning operation appears to greatly inhibit this reaction for it will be found that films deposited on non-conditioned areas will deteriorate while films laid down on conditioned areas have been found to have retained much of their original texture even after relatively long periods.

Film deposited on a surface conditioned by the discharge operation of the present invention has certain light scattering properties when examined in a strong beam of light, both by reflection and transmission. This property can be used to make reticles and targets which will glow when the body is illuminated. Thus, if the surface 16 is masked by a stencil or the like having the desired design prior to the discharge or conditioning operation and the stencil held in position during the discharge as well as the film-forming operation, the metal deposited through the opening of the stencil will form an opaque or semi-opaque part for day use but which when illuminated with side light will appear bright on a dark field for night use.

It is known that some semi-opaque metal films, if evaporated at a steep angle of incidence, show dichroism, that is, they have a preferred direction and will light up the field between crossed Nicols when the same are rotated in the field in their own plane.

This property is accentuated with some metals, such as aluminum and chromium, if the surface taking the aluminum or chromium film is conditioned by the discharge operation heretofore described before the film is deposited on the surface. If it is desired to utilize this property of some evaporated films, the filament 32 may be used to evaporate the film-forming material. The filament 32 is laterally displaced from the filament 28 and will evaporate the metal onto the surface of the body carried by the support 25 at an angle of incidence approximately 45° or more. The filament is carried by the base plate 26 by means such as heretofore described in connection with the filament 28 and is energized through suitable lead conductors similar to conductor 31.

I have found that normally plane polarized light is rotated more when reflected or transmitted by a film evaporated at high angles of incidence when produced by the present invention than by film heretofore evaporated at high angles of incidence on surfaces not pretreated by the conditioning cycle of the method herein disclosed. Furthermore, an evaporated film of the present invention will also impart a greater ellipticity to the light than films evaporated on surfaces not conditioned as taught by the present invention.

The polarization effects described may be used to form a polarizing instrument having a field with two sharply delineated halves with different polarimetric characteristics. In such a field one-half would remain unchanged as the field is rotated in its own plane, the other half of the field, as it is formed by a film deposited on a conditioned surface, will light up as does a crystal plate when rotated between crossed Nicols. Such a field could be formed by a plate made by conditioning only one-half of the desired surface, as by masking the opposite half of the plate, and then evaporating the film over the entire surface at a rather high angle of incidence, preferably as high as 45° or higher.

If it is desired to form the film by sputtering the film forming metal, the electrode 17 may be removed from the support 18 and an electrode of the desired material substituted in its place. I have found that some sputtered films deposited on surfaces conditioned by the discharge cycle of the method of the present invention are more abrasive-resistant than films sputtered on unconditioned surfaces. Another phenomena observed with sputtered films particularly platinum is that such films become dichroic when rubbed lightly with cotton. In such films the preferred direction is in the direction of the stroke.

Where it is desired to form a film having a plurality of zones of different optical characteristics, apparatus such as shown in Figs. 3 and 4 may be used. This apparatus, as shown, comprises a supporting plate 34 on which is mounted a bell jar 35. The wall of the bell jar carries a support 36 for an electrode 37, which is electrically connected to a lead-in conductor 38 interconnecting the electrode and a source of high voltage current, not shown. A second electrode 39 is detachably secured to a suitable mount 41, insulatedly carried by the plate 34 and is connected to the suitable source of current by a lead 42. The body 13 to be coated is held in a suitable carrier 43 having a pedal portion 44 secured to the plate 34. A plurality of shutters or occluding plates 45 are mounted for movement relative to the surface 16 of the body 13 intermediate the same and the electrode 39. In the preferred embodiment of the present invention, the shutters 45 are made integral with a carrier 46 detachably carried by a shaft 47 rotatably mounted in a well 48 fixed to the base plate 34 and depending therefrom. To support the shaft 47 in the well 48 for rotation, the former carries a number of dry bearings 49 engaging the inner wall of the well 48 and adapted to operate substantially without lubrication.

The well 48 is formed of some non-magnetic material so that the carrier 46 may be readily operated by means of an electromagnet or the like held near that portion of the well 48 adjacent to an iron weight 51 carried at the lower end of the shaft 47. Thus, through manipulation of the magnet, the shaft 47 may be rotated so that the plates 45 can be selectively moved relative to the surface to be treated.

It will be seen, referring now to Fig. 3 that the plates 45 are different lengths and that each will cover or block a different portion of the surface 16 of the body 13 as the plates are rotatably moved to a position intermediate the surface 16 and the electrode 39. Accordingly, if the longer of the plates 45 is first moved into position as shown in Fig. 3 and the electrodes 37 and 39 energized, a small area of the surface 16 will be subject to the discharge between the electrodes. After this area has been treated for the desired length of time, the next longest plate may be moved into position and a larger area of the surface 16, including the area previously treated, will be exposed to the discharge. This operation may be repeated until all plates have been used, whereupon the installation may be broken down and the electrode 39 detached from the support 41 for replacement by an electrode formed of the film-forming metal, or the body may be removed to the bell jar 27 where the film may be evaporated as heretofore described.

If the electrode 39 is substituted for one formed of the material to be sputtered, care must be taken to prevent the plates from shielding the surface during the sputtering operation. This can be done either by removing the carrier 46 or moving the same to a position in which the plates 45 will not interfere with the deposition of the metal being sputtered.

Whether the film is formed by sputtering the film-forming material or evaporating the same, it forms more readily on that portion of the surface 16 not subject to the discharge, that is, that portion of the surface covered by the shorter of the plates 45 during the last step of the conditioning operation just described and consequently this portion of the surface will take a heavier coating of material than the remainder of the surface. The portion of the surface exposed to the discharge the greatest length of time will take the lightest coating while the portions exposed to the successively shorter period will take successively heavier coating. Thus, the surface 16 of the finished product will have a plurality of well-defined zones of different reflection characteristics as well as transmission, where the body is transparent or translucent. If a larger or smaller number of zones is desired, the carrier 46 illustrated in Fig. 3 may be removed from the shaft 47 and a carrier substituted therefor having the number and size of plates necessary to obtain the number and size of zones desired.

As the effect of the discharge varies in accordance with the distance the conditioning electrode is spaced from the surface to be coated, a film can be deposited having a plurality of zones of different optical characteristics by varying the distance between certain portions of the electrode and the surface. There is shown in Fig. 5 an electrode 52 which can be substituted for the electrode 17 by merely threading the latter from the support 18 and threading the electrode 52 thereon. It will be seen that when the electrode 52 is mounted to the support 18 the surface 53 threof will be disposed a greater distance from the surface 16 than the distance between the surface to be treated and the surface 54 of the electrode 52. An evaporated or sputtered film may be deposited on a surface treated by an electrode such as that shown in Fig. 5 and the resultant film will have two zones of different reflection characteristics and transmission as well if the body is formed of a transparent or translucent material.

An electrode 55, referring now to Fig. 6, can be used if it is desired to have the optical characteristics of film gradually changed across the film. The electrode 55 when mounted on the support 18 obliquely extends relative to the surface 16 and the effect of the discharge created by the high voltage sent between the electrodes 17 and 22 will vary across the surface 16. A minimum effect is had where the adjacent face of the electrode 55 is spaced the maximum distance from the surface 16 and a maximum effect with the face of the electrode at the minimum distance. The resultant film when the electrode 55 is used for the conditioning discharge, whether the film be evaporated or sputtered, will have a zone of maximum reflectivity where the surface 16 was spaced the greatest distance from the face of the electrode 55 while the film adjacent the opposite margin of the surface 16 will be considerably less reflective. The transmission characteristics of the film, when the body is transparent or translucent, will vary in the reverse manner, the transmission being greatest at the margin spaced the minimum distance from the electrode.

The procedure above described has proven to be a practical way of carrying out the method of my invention but I do not commit myself to the details of the method nor the apparatus disclosed for carrying out the method, and it is to be understood that the invention is not limited to the preferred embodiment described, but is susceptible of changes in form and detail within the scope of the appended claims.

I claim:

1. The method of forming on a surface of a body a thin metallic film with different areas having respectively different light transmitting and reflecting characteristics which comprises the steps of subjecting the surface to an electrical discharge and respectively varying the discharge that acts upon the different areas and thereafter depositing a thin metallic film on said areas in vacuo.

2. The method of forming on a surface of a body a thin metallic film having different areas of respectively different light transmitting and reflecting characteristics which comprises the steps of subjecting the different areas to different amounts of electrical discharge in an evacuated chamber from an electrode which does not disintegrate when energized, and thereafter depositing a thin metallic film on said areas in an evacuated chamber.

3. In an apparatus of the type described, the combination of a container, means for evacuating the container, a pair of electrodes in the container, one of said electrodes being formed of a material that will not disintegrate when energized, means in said container for holding a body having a surface to be treated, the body being held with said surface facing the last named electrode, means for creating a high voltage discharge between the electrodes and means for selectively varying the discharge applied to different areas of the surface.

4. In an apparatus of the type described, an evacuated container, a pair of electrodes in the container, means for holding in the container a body having a surface to be treated, means for supplying a high voltage discharge between the electrodes, one of the electrodes being formed of a material which will not disintegrate when energized and having face means with an area which is at least coextensive with the area of the surface, said body being positioned with the surface towards said face means, some areas of said surface being closer to said face means than other areas of the surface whereby the discharge applied to the surface will be varied for different areas thereof.

5. In an apparatus of the type described, the combination of a container, means for evacuating the container, a pair of electrodes within the container, means for supporting in the container a body having a surface to be treated, one of the electrodes being formed of a material that will not disintegrate when energized, said electrode being positioned closely adjacent to and facing said surface, masking means movably mounted between the surface and said electrode, means for selectively moving the masking means, and means for supplying electrical current to the electrodes.

ARTHUR F. TURNER.